United States Patent [19]

Whitcomb

[11] Patent Number: 4,864,699
[45] Date of Patent: Sep. 12, 1989

[54] CLIP APPARATUS

[76] Inventor: Valerie J. Whitcomb, 6106 Bangor Dr., Alexandria, Va. 22303

[21] Appl. No.: 159,750

[22] Filed: Feb. 24, 1988

[51] Int. Cl.⁴ ............................................. A44B 21/00
[52] U.S. Cl. ...................................... 24/499; 24/498; 24/67.5
[58] Field of Search ................. 24/499, 498, 518, 517, 24/511, 67.5, 67.11

[56] References Cited

U.S. PATENT DOCUMENTS

| | | | |
|---|---|---|---|
| 716,472 | 12/1902 | Pilcher | 24/518 |
| 908,537 | 1/1909 | Baker | 24/499 |
| 1,083,678 | 1/1914 | Fryett | 24/498 |
| 2,668,341 | 2/1954 | Arzt | 24/499 |
| 2,784,470 | 3/1957 | Watson | 24/67.5 |
| 2,841,853 | 7/1958 | Guyot | 24/499 |
| 2,971,236 | 2/1961 | Baker | 24/498 |
| 3,087,218 | 4/1963 | Fanning, Jr. | 24/518 |
| 3,561,077 | 2/1971 | Grant | 24/517 |
| 4,114,240 | 9/1978 | Nackenson | 24/67.11 |

FOREIGN PATENT DOCUMENTS

| | | | |
|---|---|---|---|
| 3019707 | 12/1981 | Fed. Rep. of Germany | 24/67.5 |
| 1468138 | 2/1967 | France | 24/499 |
| 2360706 | 3/1978 | France | 24/499 |
| 0837834 | 6/1960 | United Kingdom | 24/499 |

Primary Examiner—Victor N. Sakran

[57] ABSTRACT

A snap-type clip includes an L-shaped support member having a mounting arm and a gripping arm. An elongated gripping element is pivotally attached to the inner surface of the mounting arm and in a closed position abuts against the inner surface of the gripping arm. The mounting end of the gripping element is furnished with an egg-shaped loop of resiliently deformable material. This loop is increasingly deformed by the mounting arm inner surface as the gripping element pivots from the open or closed position toward center. The gripping element is thus biased toward an open or closed position.

8 Claims, 2 Drawing Sheets

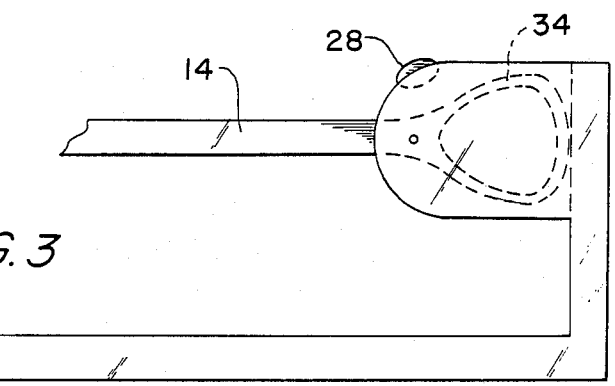
FIG. 3
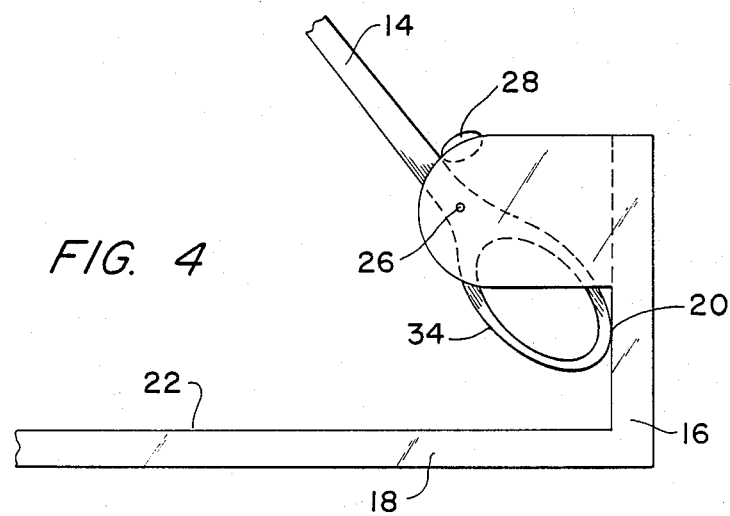
FIG. 4
FIG. 5
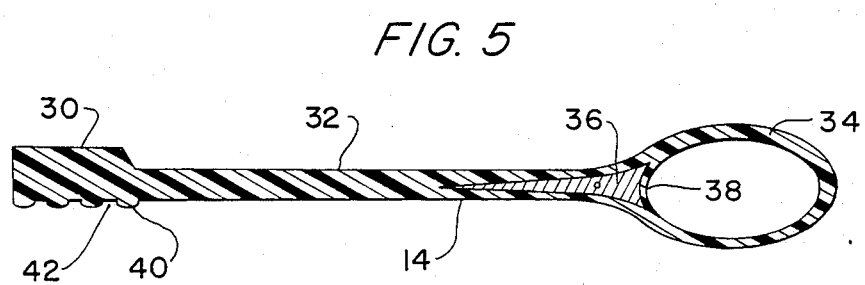

CLIP APPARATUS

BACKGROUND OF THE INVENTION

1. Field of the Invention

This invention relates to clips, and specifically to clips adapted to secure two relatively flat articles together, or to secure a flat article to an article of clothing.

More specifically, this invention relates to such clips which snap shut on the articles to be clipped, rather than sliding over them.

2. Description of the Prior Art

The following references are found to be exemplary of the U.S. prior art:

| U.S. Pat. No. | Inventor |
| --- | --- |
| 2,668,341 | Arzt |
| 2,784,470 | Watson |
| 2,971,236 | Baker |
| 3,087,218 | Fanning |

U.S. Pat. Nos. 2,668,341 and 2,784,470 disclose clips with L-shaped support members and gripping members pivotally mounted thereon.

U.S. Pat. No. 2,971,236 teaches the construction of a fastening device wherein the gripping element has a rounded portion at the end adjacent its axis which acts as a cam, thereby providing bias toward an open or closed position.

U.S. Pat. No. 3,087,218 discloses a resilient clothespin wherein a portion of one of the members is deformed when the device is in the closed position, thus providing bias toward an open position.

None of the above-cited prior art, taken singularly or in combination, discloses the features of the present invention.

SUMMARY OF THE INVENTION

It is an object of the present invention to provide a clip apparatus wherein the gripping element is biased toward both an open and closed position.

It is a further object of the present invention to provide a clip apparatus having deformable means adjacent the mounting end of its gripping element, which deformable means contacts and is deformed by a support member as the gripping element moves toward center from either an open or closed position, whereby the gripping element is thereafter biased toward either an open or closed position.

It is yet another object of the present invention to provide a clip apparatus wherein the gripping element stands open then snaps down, thereby avoiding dragging of the clip surface over an article to be fastened.

It is a further object of the present invention to provide a clip which fastens without the use of sharp edges or teeth, thereby avoiding damage to the articles being clipped.

The present invention includes an L-shaped support member having a mounting arm and a gripping arm. An elongated gripping element is pivotally mounted on the inner surface of the mounting arm and pivots between the mounting arm and the gripping arm in the plane defined thereby. The mounting end of the gripping element includes resiliently deformable means which comes into contact with and is deformed by the mounting arm inner surface as the gripping element pivots toward center from an open or closed position. The resiliently deformable means may comprise all or part of an egg-shaped loop. The gripping element is thus biased toward both an open and closed position, on opposite sides of a longitudinal axis extending through the loop.

BRIEF DESCRIPTION OF THE DRAWINGS

FIG. 3 is a side view of the present invention with the gripping element over center.

FIG. 4 is a side view of the present invention in the open position.

FIG. 5 is a section view of the gripping element showing a reinforcing element.

Similar numbers refer to corresponding parts throughout the several figures of the drawings.

DETAILED DESCRIPTION OF THE PREFERRED EMBODIMENT

Figure 1:
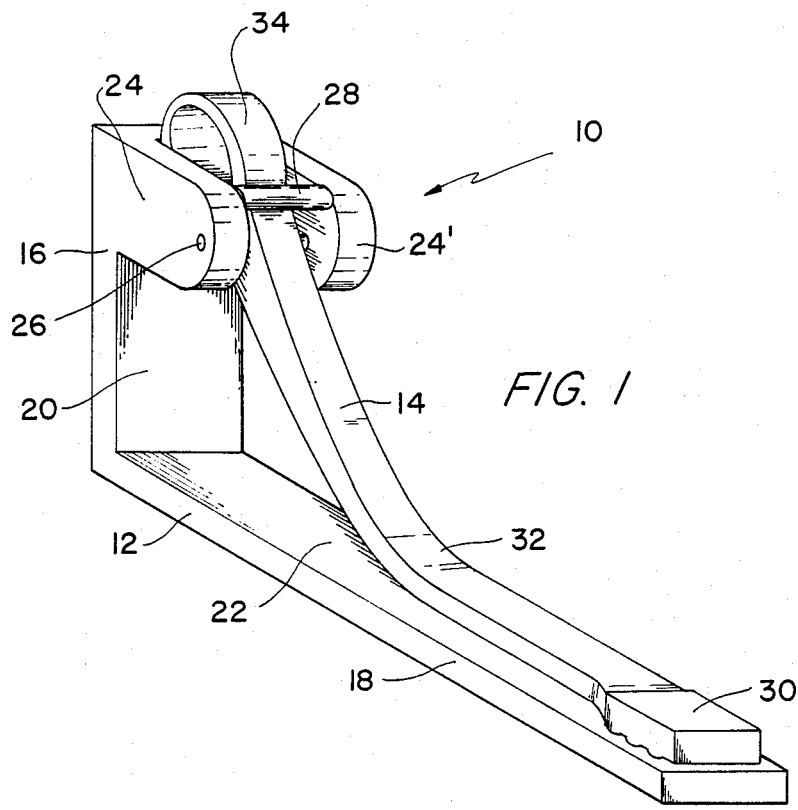
FIG. 1 is a perspective view of a preferred embodiment of the present invention.

Turning now to FIG. 1, clip 10 can be seen to comprise L-shaped support member 12 and elongated gripping element 14. Support member 12 comprises mounting arm 16 and an adjacent gripping arm 18, furnished with inner surfaces 20 and 22, respectively. Support member 12 is preferably formed from thermoplastic material.

Mounting arm 16 is furnished with integral support flanges 24 and 24', which are preferably rounded so as to avoid the protrusion of sharp edges. Support rod 26 extends between flanges 24 and 24'. Stop 28 also extends between flanges 24 and 24'.

Gripping element 14 is pivotally mounted on support rod 26 and pivots in the plane defined by support member 12. Gripping element 14 comprises gripping head 30, arm 32 and loop 34. Gripping element 14 is preferably formed from resiliently deformable material such as plastic.

As shown in FIG. 5, a generally V-shaped reinforcing element 36 extends from the bottom portion 38 of loop 34 approximately ⅓ of the way down arm 32, and renders this part gripping element 14 inflexible. Gripping element 14 is preferably injection molded and reinforcing element 36, which is preferably metal, is cast inside it.

Gripping head 30 may be thicker than arm 14 so that it may more easily be grasped, and may have rounded ridges 40 on its undersurface 42 to aid in gripping. Loop 34 is preferably egg-shaped.

As shown in FIG. 4, when clip 10 is in an open position, gripping element 14 abuts stop 28. Loop 34 is flush against the inner surface 20 of mounting arm 16 and may be slightly deformed thereby. Clip 10 is thus held in an open position.

As gripping element 14 is pivoted toward center, the distal portion of loop 34 is increasingly deformed, thereby providing increasing bias toward the open position. As shown in FIG. 3, loop 34 reaches its maximal deformation as gripping element 14 passes through central orientation.

Figure 2:
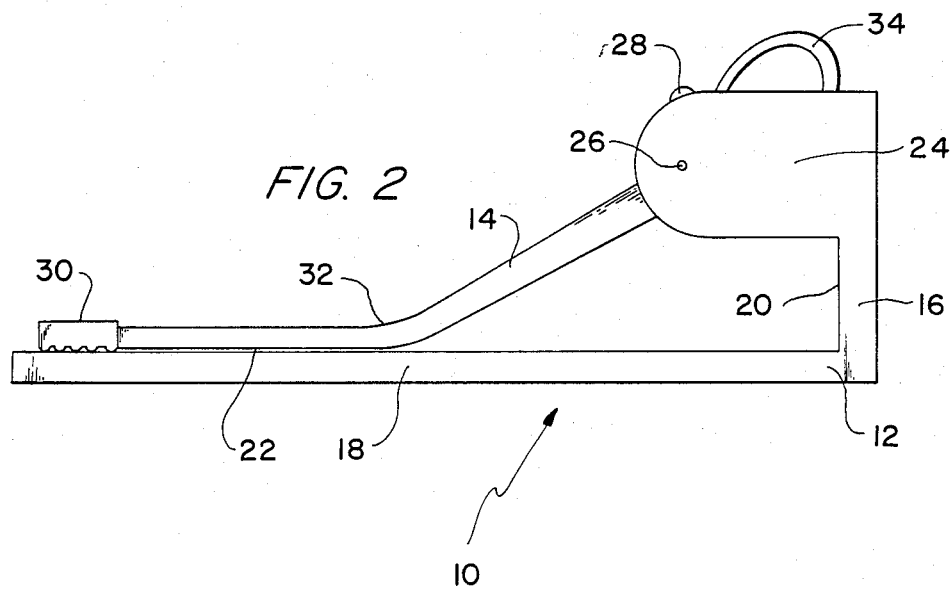
FIG. 2 is a side view of the present invention in the closed position.

FIG. 2 shows clip 10 in the closed position. As can be seen, loop 34 has regained its original shape, although it may remain slightly deformed to provide bias to keep gripping element 14 in a closed position. Gripping head 30 and the flexible (unreinforced) portion of arm 32 are flush against the inner surface 22 of gripping arm 18, providing increased contact area and greater gripping power.

If technology permits, the proximal portions of arm 32 and loop 34 may be formed of relatively rigid plastic material, thereby avoiding the need for reinforcing element 36.

In an alternative embodiment, loop 34 may be formed of spring steel, thereby creating a more powerful clip. In this embodiment, loop 34 may be integral with reinforcing element 36, or the entire gripping element 14 may be formed from steel.

Although in the preferred embodiment the resiliently deformable means which biases gripping element 14 toward an open or closed position comprises loop 34, other means may be employed, such as a solid egg-shaped member consisting of foam or rubber material.

It is to be understood that the present invention is not limited to the preferred embodiment described above, but encompasses any and all embodiments within the scope of the following claims.

I claim:

1. A clip apparatus comprising:
   a substantially L-shaped support member having a shorter mounting arm and a gripping arm, each said arm oriented in a common plane, and having an inner surface,
   an elongated gripping element having a gripping end and a mounting end, said mounting end pivotally attached to said inner surface of said shorter mounting arm permitting said gripping element to pivot in said common plane,
   said gripping element pivotable between a closed position abutting said gripping arm, through a central orientation, and an open position away from said gripping arm,
   said mounting end including a resilient material formed in at least a partially resiliently deformable loop, said at least partially resiliently deformable loop coming into contact with and being formed by said inner surface of said mounting arm as said gripping element is pivoted from either said open or closed position toward said central orientation, whereby said gripping element is biased toward and retained in either said open or closed position.

2. The apparatus of claim 1 wherein said loop is substantially egg-shaped.

3. The apparatus of claim 1 wherein said loop comprises spring steel.

4. The apparatus of claim 1 wherein said gripping element includes a reinforcing element rendering a portion of said gripping element inflexible.

5. The apparatus of claim 1 wherein said mounting arm includes two flanges, said gripping element being mounted between said flanges.

6. The apparatus of claim 5 having stop means mounted between said flanges, said stop means limiting the extent of movement of said gripping element away from said gripping arm.

7. The apparatus of claim 1 wherein said gripping element includes a gripping head having an undersurface furnished with lateral gripping ridges.

8. The apparatus of claim 1 wherein said support member and said gripping element are formed from thermoplastics material.

* * * * *